(12) United States Patent
Schiek et al.

(10) Patent No.: US 10,038,354 B2
(45) Date of Patent: Jul. 31, 2018

(54) ARRANGEMENT OF AN ELECTRIC MACHINE AND OF A TRANSMISSION CONNECTED DOWNSTREAM THEREOF

(71) Applicant: Dr. Ing. h.c. F. Porsche Aktiengesellschaft, Stuttgart (DE)

(72) Inventors: Werner Schiek, Jettingen (DE); Leo Spiegel, Vaihingen/Enz (DE); Immo Stache, Vaihingen/Enz (DE); Daniel Knoblauch, Ludwigsburg (DE); Gerhard Spengler, Jettingen (DE)

(73) Assignee: Dr. Ing. h.c. F. Porsche Aktiengesellschaft (DE)

( * ) Notice: Subject to any disclaimer, the term of this patent is extended or adjusted under 35 U.S.C. 154(b) by 389 days.

(21) Appl. No.: 14/748,308

(22) Filed: Jun. 24, 2015

(65) Prior Publication Data

US 2016/0006321 A1  Jan. 7, 2016

(30) Foreign Application Priority Data

Jul. 1, 2014 (DE) .......................... 10 2014 109 177

(51) Int. Cl.

| | |
|---|---|
| *H02K 9/19* | (2006.01) |
| *F16H 3/58* | (2006.01) |
| *F16H 57/04* | (2010.01) |
| *F16H 1/28* | (2006.01) |
| *F16H 3/66* | (2006.01) |
| *H02K 5/20* | (2006.01) |
| *H02K 7/116* | (2006.01) |

(52) U.S. Cl.
CPC ................. *H02K 9/19* (2013.01); *F16H 1/28* (2013.01); *F16H 3/663* (2013.01); *F16H 57/0412* (2013.01); *F16H 57/0484* (2013.01); *H02K 5/20* (2013.01); *H02K 7/116* (2013.01); *F16H 2001/2881* (2013.01)

(58) Field of Classification Search
CPC . B60K 6/26; B60K 6/365; B60K 6/40; H02K 9/19; H02K 7/116; H02K 5/20; F16H 57/0484; F16H 1/28; F16H 57/0412
See application file for complete search history.

(56) References Cited

U.S. PATENT DOCUMENTS

| | | | | |
|---|---|---|---|---|
| 5,508,574 | A * | 4/1996 | Vlock .................... | B60K 6/445 310/113 |
| 7,259,493 | B2 * | 8/2007 | Oshidari ................. | B60K 6/26 180/65.6 |
| 7,479,080 | B2 * | 1/2009 | Usoro .................... | B60K 6/365 180/65.25 |
| 8,425,376 | B2 * | 4/2013 | Schoenek ............. | B60K 6/405 180/65.22 |
| 8,974,338 | B2 * | 3/2015 | Holmes ................. | B60K 6/365 475/218 |
| 2006/0244317 | A1 | 11/2006 | Kramer | |

(Continued)

*Primary Examiner* — Ramya P Burgess
*Assistant Examiner* — Lillian T Nguyen
(74) *Attorney, Agent, or Firm* — Gerald E. Hespos; Michael J. Porco; Matthew T. Hespos

(57) ABSTRACT

An arrangement (1) for driving a wheel of a motor vehicle has an electric machine (6) and a transmission (4). The transmission (4) is downstream of the electric machine (6) and is arranged within the electric machine (6). A common cooling device (14) with a cooling water jacket (15) is utilized for cooling both the electric machine (6) and the transmission (4).

19 Claims, 1 Drawing Sheet

(56) References Cited

U.S. PATENT DOCUMENTS

2013/0307357 A1* 11/2013 Maksumic ............... H02K 5/20
                                                  310/54
2014/0070637 A1*  3/2014 Hamer ................... H02K 15/03
                                                  310/54

* cited by examiner

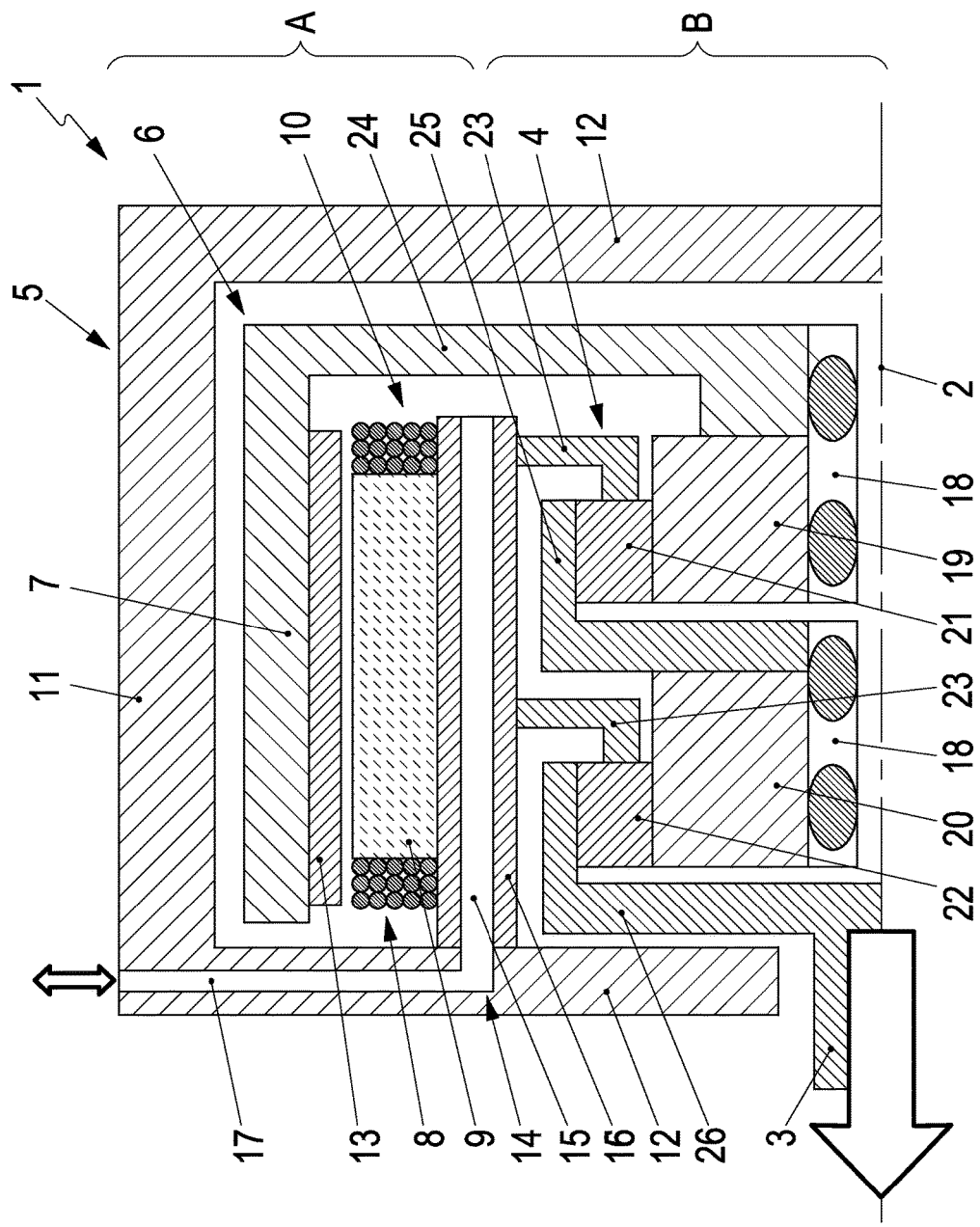

ARRANGEMENT OF AN ELECTRIC MACHINE AND OF A TRANSMISSION CONNECTED DOWNSTREAM THEREOF

CROSS REFERENCE TO RELATED APPLICATION

This application claims priority under 35 USC 119 to German Patent Appl. No. 10 2014 109 177.9 filed on Jul. 1, 2014, the entire disclosure of which is incorporated herein by reference.

BACKGROUND

1. Field of the Invention

The invention relates to an arrangement of an electric machine and a transmission connected downstream thereof, wherein the transmission is within the electric machine and the electric machine has a cooling device.

2. Description of the Related Art

Electric machines and transmissions have been used for driving wheel of a motor vehicle, such as a hybrid vehicle or an exclusively electrically driven motor vehicle where each wheel of the motor vehicle is assigned an electric machine.

US 2006/0244317 discloses an arrangement of an electric machine and a transmission where the electric machine has an external or internal rotor. One variant of the electric machine of US 2006/0244317 has a water cooled stator that is understood to mean liquid-type cooling for protecting the electric machine against overheating. Another variant proposed in US 2006/0244317 has the cooling of the electric machine performed externally. The transmission disclosed in US 2006/0244317 is arranged within the electric machine and is in the form of a planetary gear set.

An object of the invention is to provide a structurally simple arrangement of an electric machine and a transmission that ensures good cooling of both the electric machine and the transmission connected downstream thereof.

SUMMARY OF THE INVENTION

The invention relates to an arrangement of an electric machine and a transmission where a cooling water jacket is utilized both for cooling the electric machine and for cooling the transmission.

The cooling water jacket may be arranged between the electric machine and the transmission and may be positioned annularly around the transmission, between the electric machine and the transmission. The electric machine may have an external rotor and the cooling water jacket may be arranged between the internal stator of the electric machine and the transmission.

To achieve structural simplicity, the cooling water jacket can be integrated into a hollow cylinder that is fixed with respect to a housing. The cylinder may hold the stator radially at the outside and may accommodate components of the transmission radially at the inside. The transmission may be arranged entirely within the electric machine to yield a particularly compact axial construction of the arrangement. In one embodiment, the transmission does not protrude axially beyond the electric machine in either axial direction.

The electric machine may have a static housing, and the transmission may be arranged entirely within the housing. The housing thus may accommodate the stator. This design ensures that the static housing fully encloses both the electric machine and the transmission. This is advantageous with regard to each different variant of mounting the housing and with regard to sealing the arrangement with respect to the outside.

The housing may have an outer housing section radially at the outside and inner housing sections between the outer housing section and an axis of rotation of the drive output shaft of the transmission. The transmission may be between U-shaped inner housing sections, with the U-shaped inner housing sections opening toward the rotational axis of the drive output shaft of the transmission.

The transmission may be a planetary gear set. The planetary gear set requires little space and expediently can be arranged within the electric machine. The specific design of the planetary gear set can be varied. In particular, the planetary gear set may have a sun gear at the input side, an internal gear at the output side, and planet gears assigned to the housing. The cooling water jacket may be integrated into a hollow cylinder that is fixed with respect to a housing and that is radially at the outside. The stator and components of the transmission may be inward of the cooling water jacket. The planet gears of the planetary gear set may be mounted radially inward of the hollow cylinder.

The transmission may be a single-stage or two-stage planetary gear set or Ravigneaux gear set.

Further features of the invention will emerge from the appended drawing and from the description of the embodiment depicted in the drawing, without the invention being restricted to the exemplary embodiment.

BRIEF DESCRIPTION OF THE DRAWINGS

FIG. 1 shows a section through an arrangement of an electric machine and of a transmission connected downstream thereof, depicted in a schematic illustration.

DETAILED DESCRIPTION

The FIGURE shows only one half of an arrangement 1 that is rotationally symmetrical about an axis of rotation 2 of a drive output shaft 3 of the transmission 4. The arrangement 1 has a housing 5 that is radially at the outside, an electric machine 6 and a transmission 4 that is radially at the inside.

The region A illustrates the electric machine 6 arranged at the outside, and the region B illustrates the transmission 4 arranged at the inside.

The electric machine 6 has an external rotor 7 and an internal stator 8. The stator 8 has a coil core 9 and a coil winding 10.

The static housing 5 has an outer housing section 11 radially at the outside and inner housing sections 12 between the outer housing section 11 and the axis of rotation 2 of the drive output shaft 3 of the transmission 4. The electric machine 6 and the transmission 4 are arranged between the inner housing sections 12. Radially at the inside, the rotor 7 is equipped with permanent magnets 13.

The electric machine 6 and the transmission 4 have a common cooling device 14 that includes a cooling water jacket 15 arranged between the stator 8 of the electric machine 6 and the transmission 4. The cooling water jacket 15 is integrated into a hollow cylinder 16 that is mounted in one of the inner housing sections 12. The stator 8 is connected to the radially outer side of the hollow cylinder 16 and components of the transmission 4 are accommodated radially at the inside of the hollow cylinder 16. Cooling lines 17 extend through one housing section 12 and through the hollow cylinder 16 for supplying and discharging cooling water to and from the cooling water jacket 15.

The transmission 4 arranged within the hollow cylinder 16 is a planetary gear set with two deep-groove ball bearings 18 that mount two sun gears 19, 20 for rotation about the axis of rotation 2. The sun gear 19 meshes with planet gears 21, and the sun gear 20 meshes with planet gears 22 that are mounted rotatably in holders 23 that are connected to the radially inner side of the hollow cylinder 16. The rotor 7 is connected rotationally conjointly to the sun gear 19 by way of a radially extending projection 24, and the projection 24 of the rotor 7 is mounted by way of the deep-groove ball bearing 18 assigned to said sun gear 19. Thus, during the operation of the electric machine 6, the rotor 7 drives the sun gear 19, and the sun gear, via the planets 21, drives an internal gear 25 that meshes with the planets 21. The internal gear is connected rotationally conjointly to the other sun gear 20 and is arranged between the sun gears 19 and 20. The sun gear 20, via the planets 22, drives a further internal gear 26 that is connected rotationally conjointly to the drive output shaft 3. The drive output shaft 3 drives a wheel of a motor vehicle.

The described arrangement 1 has a common cooling device 14 for the electric machine 6 and the transmission 4. The cooling device 14 has the cooling water jacket 15 for cooling both the electric machine 6 and the transmission 5. The cooling water jacket 15 is in the direct vicinity of the intermeshing components of the transmission 4, specifically the respective sun gear and internal gear and the planet gears that mesh therewith. The transmission 4 is arranged entirely within the electric machine 6 and does not protrude axially beyond the electric machine 6 in either direction along the axis of rotation 2.

What is claimed is:

1. An arrangement for driving at least one wheel of a motor vehicle, the arrangement comprising:
   an electric machine;
   a transmission connected downstream of the electric machine and arranged entirely within the electric machine; and
   a common cooling device having a cooling water jacket that is utilized for cooling both the electric machine and the transmission;
   wherein the cooling water jacket is arranged adjacent to and between the electric machine and the transmission.

2. The arrangement of claim 1, wherein the electric machine has an external rotor and an internal stator, the cooling water jacket being arranged between the internal stator of the electric machine and the transmission.

3. The arrangement of claim 2, wherein the cooling water jacket is integrated into a hollow cylinder that is fixed to a housing in which the electric machine and transmission are contained, the hollow cylinder having an outside that holds the stator and having an inside that accommodates components of the transmission.

4. The arrangement of claim 2, wherein the electric machine has a housing that accommodates the stator, the transmission being arranged entirely within the housing.

5. The arrangement of claim 4, wherein the housing has an outer housing section arranged radially at outward of the housing and inner housing sections arranged between the outer housing section and an axis of rotation of a drive output shaft of the transmission, the transmission being arranged between the inner housing sections.

6. The arrangement of claim 1, wherein the transmission is a planetary gear set.

7. The arrangement of claim 6, wherein the planetary gear set has a sun gear at an input side, an internal gear at an output side, and at least one planet gear engaged with the sun gear and internal gear.

8. The arrangement of claim 6, wherein the transmission is a single-stage or two-stage planetary gear set or Ravigneaux gear set.

9. The arrangement of claim 1, wherein the cooling water jacket is arranged annularly around the transmission.

10. An arrangement for driving at least one wheel of a motor vehicle, the arrangement comprising:
    an electric machine having an external rotor and an internal stator;
    a transmission connected downstream of the electric machine and arranged within the electric machine so that the transmission does not protrude beyond the electric machine in either axial direction of the rotor; and
    a common cooling device having a cooling water jacket that is utilized for cooling both the electric machine and the transmission, the cooling water jacket being arranged between the internal stator of the electric machine and the transmission.

11. A system for driving a motor vehicle, the system comprising:
    a static housing;
    an electric motor arranged within the static housing;
    a transmission arranged within the electric motor, the transmission including a planetary gear set; and
    a cooling water jacket arranged adjacent to and between the electric motor and the transmission, the cooling water jacket configured to cool both the electric motor and the transmission.

12. The system of claim 11, wherein the transmission is arranged entirely within the electric machine.

13. The system of claim 11, wherein the electric motor includes an external rotor surrounding an internal stator, and wherein the cooling water jacket is arranged between the internal stator of the electric motor and the transmission.

14. The system of claim 13, further comprising a hollow cylinder fixed to the static housing, wherein the cooling water jacket is integrated into the hollow cylinder.

15. The system of claim 14, wherein the hollow cylinder includes an outside portion configured to hold the stator and an inside portion configured to accommodate components of the transmission.

16. The system of claim 11, wherein the static housing includes an outer housing section arranged radially outward of the static housing and inner housing sections arranged between the outer housing section and an axis of rotation of a drive output shaft of the transmission, and wherein the transmission is arranged between the inner housing sections.

17. The system of claim 11, wherein the planetary gear set includes a first sun gear at an input side, a first internal gear at an output side, and at least one planet gear.

18. The system of claim 17, wherein a first planet gear is engaged with the first sun gear and a second internal gear, and wherein a second planet gear is engaged with a second sun gear and the first internal gear.

19. The system of claim 11, wherein the cooling water jacket is arranged annularly around the transmission.

* * * * *